US012656215B2

(12) United States Patent (10) Patent No.: US 12,656,215 B2
Sakuma et al. (45) Date of Patent: Jun. 16, 2026

(54) ECCENTRICITY MEASUREMENT METHOD AND MEASUREMENT SYSTEM

(71) Applicant: Panasonic Intellectual Property Management Co., Ltd., Osaka (JP)

(72) Inventors: Tatsuya Sakuma, Hyogo (JP); Hitoshi Tanaka, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 174 days.

(21) Appl. No.: 18/761,729

(22) Filed: Jul. 2, 2024

(65) Prior Publication Data

US 2025/0044189 A1 Feb. 6, 2025

(30) Foreign Application Priority Data

Jul. 31, 2023 (JP) ................................. 2023-124848

(51) Int. Cl.
 G01M 11/02 (2006.01)

(52) U.S. Cl.
 CPC .... G01M 11/0221 (2013.01); G01M 11/0214 (2013.01); G01M 11/025 (2013.01)

(58) Field of Classification Search
 CPC ......... G01M 11/0221; G01M 11/0214; G01M 11/025; G01B 11/27
 See application file for complete search history.

(56) References Cited

U.S. PATENT DOCUMENTS

| | | | |
|---|---|---|---|
| 6,067,165 A | 5/2000 | Matsumiya et al. | |
| 2009/0207403 A1 | 8/2009 | Nemoto et al. | |
| 2010/0007895 A1 | 1/2010 | Yamagata et al. | |
| 2013/0027692 A1 | 1/2013 | Ogura et al. | |
| 2017/0248399 A1* | 8/2017 | Takahama ................ | G01B 5/12 |
| 2019/0212121 A1 | 7/2019 | Omori | |
| 2020/0141832 A1* | 5/2020 | Maeda ................. | G01M 11/025 |
| 2025/0044189 A1* | 2/2025 | Sakuma ............. | G01M 11/0214 |

FOREIGN PATENT DOCUMENTS

| | | |
|---|---|---|
| JP | 11-83438 | 3/1999 |
| JP | 2001-56217 | 2/2001 |
| JP | 2002-71344 | 3/2002 |
| JP | 3511450 | 3/2004 |
| JP | 2006-125893 | 5/2006 |
| JP | 2007-78635 | 3/2007 |
| JP | 2007-155628 | 6/2007 |
| JP | 2007-170920 | 7/2007 |

(Continued)

*Primary Examiner* — Tony Ko
(74) *Attorney, Agent, or Firm* — Wenderoth, Lind & Ponack, L.L.P.

(57) ABSTRACT

An eccentricity measurement method includes: obtaining optical surface measurement data by measuring, with use of a probe, an optical surface of an object that is a measurement target object; calculating an optical axis center position of the object from the optical surface measurement data; obtaining outline measurement data by measuring, with use of a camera, an outline of the object; calculating an outline center position of the object from the outline measurement data; and calculating an eccentricity that is an amount of deviation between the optical axis center position and the outline center position.

8 Claims, 11 Drawing Sheets

(56)              References Cited

FOREIGN PATENT DOCUMENTS

| | | |
|----|----|----|
| JP | 2008-39455 | 2/2008 |
| JP | 2009-192492 | 8/2009 |
| JP | 4324159 | 9/2009 |
| JP | 2010-19671 | 1/2010 |
| JP | 2010-170602 | 8/2010 |
| JP | 4520276 | 8/2010 |
| JP | 2011-33473 | 2/2011 |
| JP | 4767255 | 9/2011 |
| JP | 4791118 | 10/2011 |
| JP | 4835149 | 12/2011 |
| JP | 4986530 | 7/2012 |
| JP | 2012-255756 | 12/2012 |
| JP | 5236962 | 7/2013 |
| JP | 5261314 | 8/2013 |
| JP | 5582188 | 9/2014 |
| JP | 5623009 | 11/2014 |
| JP | 2017-150993 | 8/2017 |
| JP | 2019-120669 | 7/2019 |
| JP | 6692658 | 5/2020 |
| WO | 2007/018118 | 2/2007 |
| WO | 2011/129068 | 10/2011 |

* cited by examiner

FIG. 1
[When not tilted]            [When tilted]
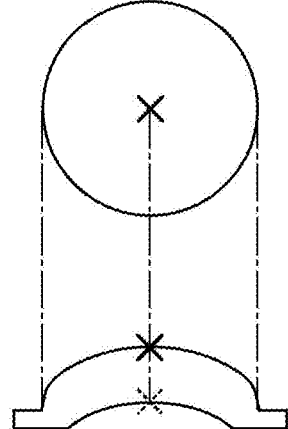
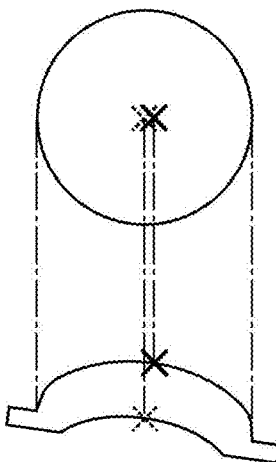
X : Center position of
front surface of lens
⤫ : Center position of
back surface of lens
(a)
X : Center position of
front surface of lens
⤫ : Center position of
back surface of lens
(b)

[When sphericity is high]          [When sphericity is low]

| Setting | (a) | (b) | (c) | (d) |
|---|---|---|---|---|
| | 0° | 90° | 180° | 270° |
| Probe measurement | | | | |
| Camera measurement | | | | |

FIG. 11

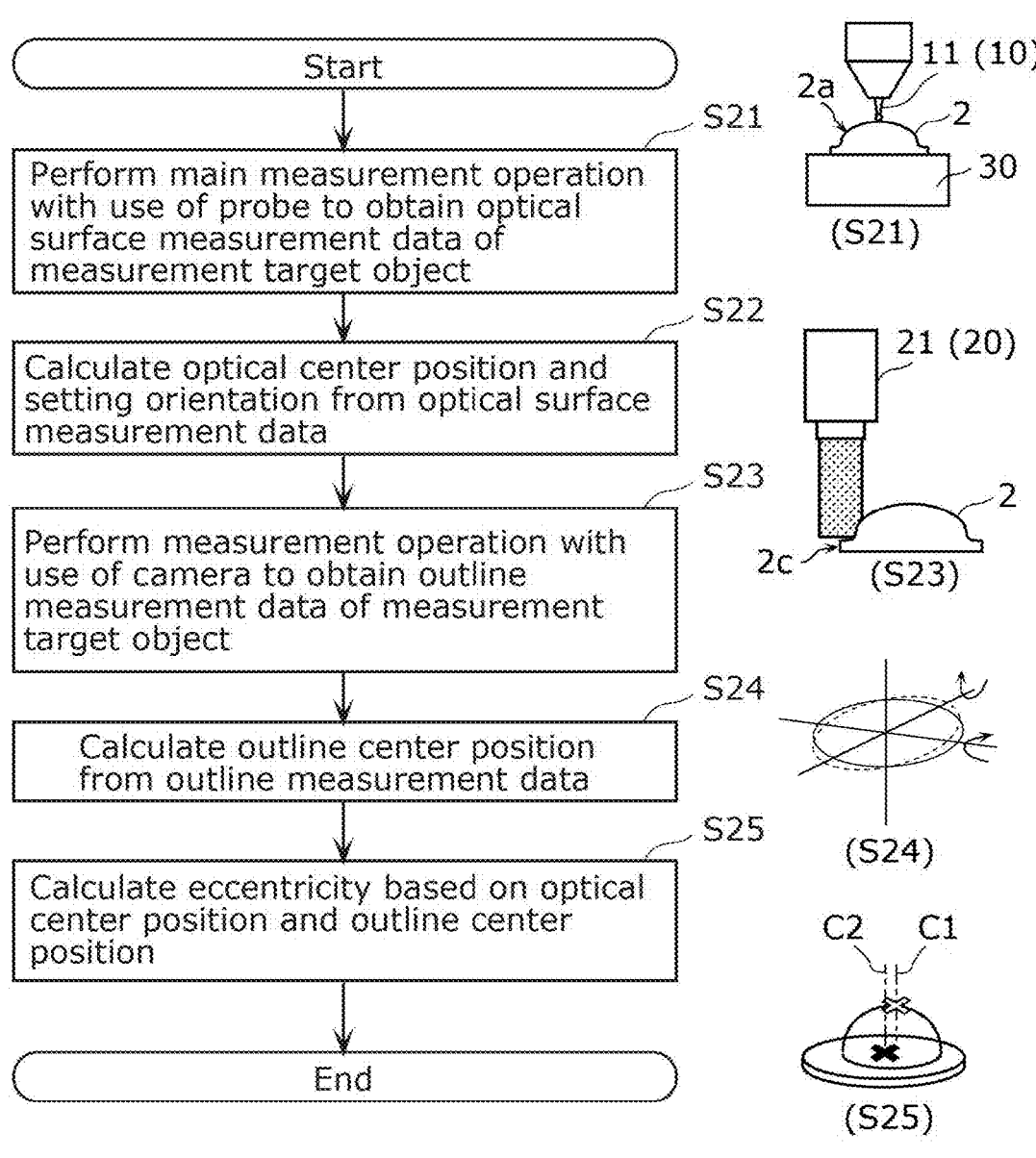

Start

S21 — Perform main measurement operation with use of probe to obtain optical surface measurement data of measurement target object (S21)

S22 — Calculate optical center position and setting orientation from optical surface measurement data S23 — Perform measurement operation with use of camera to obtain outline measurement data of measurement target object (S23)

S24 — Calculate outline center position from outline measurement data (S24)

S25 — Calculate eccentricity based on optical center position and outline center position (S25)

End

ECCENTRICITY MEASUREMENT METHOD AND MEASUREMENT SYSTEM

CROSS REFERENCE TO RELATED APPLICATION

The present application is based on and claims priority of Japanese Patent Application No. 2023-124848 filed on Jul. 31, 2023. The entire disclosure of the above-identified application, including the specification, drawings and claims is incorporated herein by reference in its entirety.

FIELD

The present disclosure relates to an eccentricity measurement method and a measurement system for measuring the eccentricity of a measurement target object.

BACKGROUND

Various types of lenses, such as aspherical or spherical lenses, are used in the optical systems of optical devices such as cameras. The presence of eccentricity in the lens used in an optical system degrades the optical performance of the entire optical system. In view of the above, conventional eccentricity measurement methods for measuring the eccentricity of a lens are known.

As an eccentricity measurement method of this type, a method of measuring the outer diameter eccentricity of a lens by bringing a probe into contact with the optical surface of the lens that is a measurement target object (target lens) is known (for example, Patent Literature (PTL) 1). A method is also known which measures the eccentricity of the front and back surfaces of a lens by measuring the positional relationship between the front and back surfaces of the lens with use of a probe and a reference jig or a reference sphere (for example, PTL 2). A method is also known which measures the eccentricity of the front and back surfaces of a lens by measuring the positional relationship between the front and back surfaces of a lens with use of a camera instead of a probe (for example, PTL 3).

CITATION LIST

Patent Literature

PTL 1: Japanese Unexamined Patent Application Publication No. 2001-56217
PTL 2: Japanese Unexamined Patent Application Publication No. 2002-71344
PTL 3: Japanese Patent No. 5582188

SUMMARY

Technical Problem

However, it is difficult to measure the eccentricity of a measurement target object with high accuracy, using conventional eccentricity measurement methods.

The present disclosure has been conceived to solve such a problem. An object of the present disclosure is to provide an eccentricity measurement method and a measurement system capable of measuring the eccentricity of a measurement target object with high accuracy.

Solution to Problem

In order to achieve the above object, one aspect of an eccentricity measurement method according to the present disclosure includes: obtaining optical surface measurement data by measuring an optical surface of an object that is a measurement target object with use of a probe; calculating an optical axis center position of the object from the optical surface measurement data; obtaining outline measurement data by measuring an outline of the object with use of a camera; calculating an outline center position of the object from the outline measurement data; and calculating an eccentricity that is an amount of deviation between the optical axis center position and the outline center position.

Moreover, one aspect of a measurement system according to the present disclosure includes: a measurement machine that includes: a probe for measuring an optical surface of an object that is a measurement target object; and a camera for measuring an outline of the object; and a calculator. The calculator: calculates an optical axis center position of the object from optical surface measurement data obtained by measuring the optical surface of the object with use of the probe; calculates an outline center position of the object from outline measurement data obtained by measuring the outline of the object with use of the camera; and calculates an eccentricity that is an amount of deviation between the optical axis center position and the outline center position.

Advantageous Effects

According to the present disclosure, the eccentricity of a measurement target object can be measured with high accuracy.

BRIEF DESCRIPTION OF DRAWINGS

These and other advantages and features will become apparent from the following description thereof taken in conjunction with the accompanying Drawings, by way of non-limiting examples of embodiments disclosed herein.

FIG. 1 illustrates a case where a lens that is a measurement target object is tilted and a case where the lens is not tilted.

FIG. 9 is an explanatory diagram of a calibration method using the calibration jig according to the variation of Embodiment 1.

FIG. 11 is a flow diagram of an eccentricity measurement method according to Embodiment 2.

Figure 2:
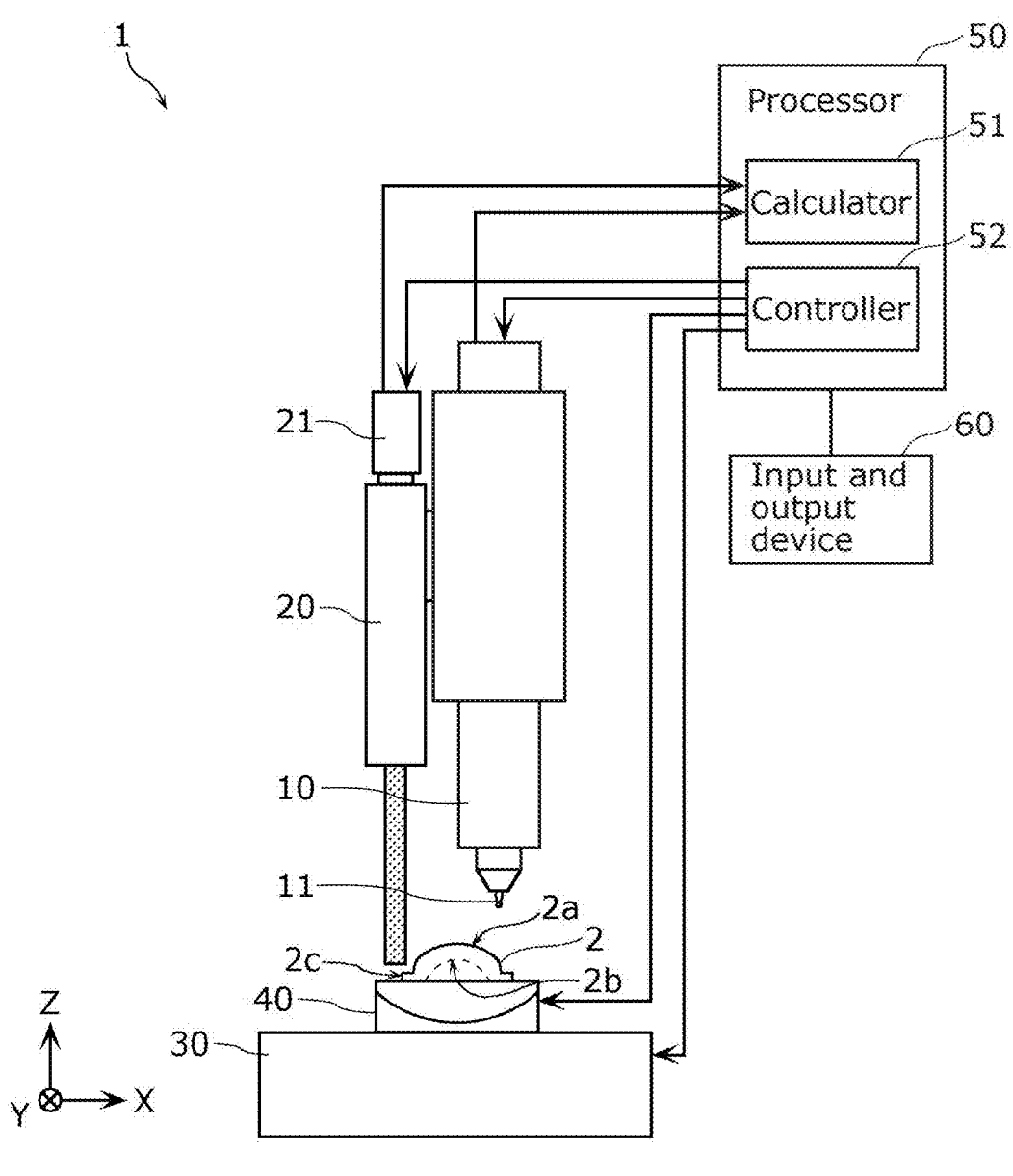
FIG. 2 illustrates a configuration of a measurement system according to Embodiment 1.

DESCRIPTION OF EMBODIMENT (Circumstances Leading to the Present Disclosure)

Before describing embodiments of the present disclosure, circumstances leading to an aspect of the present disclosure will be described.

As described above, PTL 3 discloses a method of measuring the eccentricity of the front and back surfaces of a lens by measuring the positional relationship between the front and back surfaces of the lens with use of a camera. In the eccentricity measurement method using a camera, when the lens that is a measurement target object is tilted, a measurement error is large. For example, when the lens is not tilted as illustrated in (a) of FIG. 1, the measurement error is small because there is no deviation between the center position of the front surface of the lens and the center position of the back surface of the lens. On the other hand, when the lens is tilted as illustrated in (b) of FIG. 1, a deviation is generated between the center position of the front surface of the lens and the center position of the back surface of the lens, resulting in a large measurement error. PTL 3 discloses a method of adjusting the orientation of the lens by measuring the flange surface of the lens. However, for a lens with no flange surface, it is not possible to adjust the orientation of the lens.

In such a manner, it is difficult to measure the eccentricity of a measurement target object with high accuracy using the conventional eccentricity measurement methods.

The inventors have therefore studied these issues intensively, and have found a method capable of measuring the eccentricity of a measurement target object with high accuracy by measuring the object with use of a probe and a camera. The inventors have then arrived at an aspect of an eccentricity measurement method and a measurement system according to the present disclosure.

Specifically, one aspect of an eccentricity measurement method according to the present disclosure includes: obtaining optical surface measurement data by measuring an optical surface of an object that is a measurement target object with use of a probe; calculating an optical axis center position of the object from the optical surface measurement data; obtaining outline measurement data by measuring an outline of the object with use of a camera; calculating an outline center position of the object from the outline measurement data; and calculating an eccentricity that is an amount of deviation between the optical axis center position and the outline center position.

With this, the eccentricity of the measurement target object can be measured with high accuracy.

Moreover, in one aspect of the eccentricity measurement method according to the present disclosure, it may be that in the obtaining of the optical surface measurement data: a setting orientation of the object is calculated by performing, with use of the probe, a preliminary measurement operation on the optical surface, the setting orientation being an orientation in which the object is set; an orientation of the object is adjusted based on the setting orientation, using a rotation mechanism that is rotatable in at least two axial directions; and the optical surface measurement data for calculating the optical axis center position of the object is obtained by performing, with use of the probe, a main measurement operation on the optical surface of the object whose orientation has been adjusted using the rotation mechanism.

This eliminates the tilt of the setting orientation of the measurement target object, which is an error factor in eccentricity measurement. Therefore, the eccentricity of the measurement target object can be measured with higher accuracy.

Moreover, in one aspect of the eccentricity measurement method according to the present disclosure, it may be that in the calculating of the outline center position: a setting orientation of the object is calculated from the optical surface measurement data, the setting orientation being an orientation in which the object is set; a coordinate transformation is performed on the outline measurement data based on the setting orientation; and the outline center position is calculated from the outline measurement data on which the coordinate transformation has been performed.

With this, the eccentricity of the measurement target object can be measured with high accuracy, even when the object is tilted.

Moreover, one aspect of the eccentricity measurement method according to the present disclosure may further include calibrating a position of the probe and a position of the camera, using a calibration jig that includes a reference projection that is in a rotationally symmetrical shape and has a maximum tilt angle of at most 90 degrees, and it may be that in the calibrating: a vertex position of the reference projection is calculated by measuring, with use of the probe, a vicinity of a center of the reference projection; a center position of the reference projection is calculated by measuring, with use of the camera, an edge portion of the reference projection; a difference between the vertex position and the center position is calculated as an offset amount; and the position of the probe and the position of the camera are calibrated based on the offset amount.

This allows the position of the probe and the position of the camera to be calibrated before measuring the measurement target object with use of the probe and the camera. Accordingly, the eccentricity of the measurement target object can be measured with even higher accuracy.

Moreover, in one aspect of the eccentricity measurement method according to the present disclosure, it may be that the calibration jig further includes at least one reference marker that is recognizable by the camera, and the calibrating includes: measuring a position of the reference marker with use of the camera; calculating a correction amount using a relationship between the center position of the reference projection and the position of the reference marker; and adding the correction amount calculated to the offset amount.

This improves the accuracy of the offset amount, which allows for accurate calibration of the position of the probe and the position of the camera. As a result, the eccentricity of the measurement target object can be measured with even higher accuracy.

Moreover, in one aspect of the eccentricity measurement method according to the present disclosure, it may be that the offset amount is calculated by changing a setting angle of the calibration jig at least once.

This further improves the accuracy of the offset amount, which allows for calibration of the position of the probe and the position of the camera with even higher accuracy.

Moreover, one aspect of a measurement system according to the present disclosure includes: a measurement machine that includes: a probe for measuring an optical surface of an object that is a measurement target object; and a camera for measuring an outline of the object; and a calculator. The calculator: calculates an optical axis center position of the object from optical surface measurement data obtained by measuring the optical surface of the object with use of the probe; calculates an outline center position of the object from outline measurement data obtained by measuring the outline of the object with use of the camera; and calculates an eccentricity that is an amount of deviation between the optical axis center position and the outline center position.

With such a configuration, the eccentricity of the measurement target object can be measured with high accuracy.

Moreover, in one aspect of the measurement system according to the present disclosure, it may be that the measurement machine includes: a rotation mechanism that rotates the object in at least two axial directions; and a controller that controls the rotation mechanism, the calculator calculates a setting orientation of the object from the optical surface measurement data obtained by measuring the optical surface of the object in advance with use of the probe, the setting orientation being an orientation in which the object is set, and the controller adjusts an orientation of the object by controlling the rotation mechanism based on the setting orientation, before measuring the optical surface measurement data for calculating the optical axis center position.

Such a configuration eliminates the tilt of the setting orientation of the measurement target object, which is an error factor in eccentricity measurement. Accordingly, the eccentricity of the measurement target object can be measured with even higher accuracy.

Hereinafter, embodiments of the present disclosure will be specifically described with reference to the drawings. Each of the exemplary embodiments described below shows a specific example. The numerical values, shapes, materials, elements, the arrangement and connection of the elements, and the like shown in the following exemplary embodiments are mere examples, and therefore do not limit the present disclosure. Therefore, among the elements in the following exemplary embodiments, those not recited in any one of the independent claims defining the most generic concept are described as optional elements.

The figures are not necessarily precise illustrations. In the figures, elements that are essentially the same share like reference signs, and duplicate description thereof is omitted or simplified. In the Specification, the terms "above" and "below" do not always refer to the upward direction (vertically upward) and downward direction (vertically downward) in absolute space, respectively. In the Specification and Drawings, the X-axis, the Y-axis, and the Z-axis represent the three axes in the three-dimensional orthogonal coordinate system. The X-axis and the Y-axis are orthogonal to each other, and are orthogonal to the Z-axis. In the present embodiment, the Z-axis direction refers to a vertical direction.

Embodiment 1

First, a configuration of measurement system 1 according to Embodiment 1 of the present disclosure will be described with reference to FIG. 2. FIG. 2 illustrates a configuration of measurement system 1 according to Embodiment 1.

As illustrated in FIG. 2, measurement system 1 is a system for measuring an object that is a measurement target object. Measurement system 1 includes first measurer 10, second measurer 20, stage 30, rotation mechanism 40, processor 50, and input and output device 60.

In the present embodiment, first measurer 10 and second measurer 20 are connected and integrated to form a single measurement machine. In this case, the measurement machine may include not only first measurer 10 and second measurer 20, but also include processor 50 and input and output device 60. The measurement machine may also include stage 30 and rotation mechanism 40. In such a manner, measurement system 1 may be configured as a single measurement machine.

The object to be measured by measurement system 1 is, for example, an optical component such as a lens. In the present embodiment, the object to be measured by measurement system 1 is lens 2, such as an aspherical lens. Lens 2 includes front surface 2a (outer surface) that is an outer optical surface, back surface 2b (inner surface) that is an inner optical surface, and edge 2c (end edge).

Front surface 2a and back surface 2b of lens 2 are lens surfaces that impart optical effects to the light passing through lens 2. When lens 2 is an aspheric lens, front surface 2a is aspheric. When lens 2 is a spherical lens, front surface 2a is spherical.

Edge 2c of lens 2 defines the outline of lens 2. In the present embodiment, lens 2 includes a flange portion, and edge 2c is the end edge (outer peripheral surface) of the flange portion of lens 2. Since the flange portion of lens 2 is circular, the shape (outline) of edge 2c is circular when lens 2 is viewed from the top.

First measurer 10 is a probe measurer that includes probe 11 for measuring the optical surface of lens 2 that is the measurement target object. Probe 11 is a three-dimensional measurement probe that includes a stylus whose tip contacts the measurement target object with a constant pressing force. First measurer 10 measures the optical surface of lens 2 with use of probe 11. Specifically, first measurer 10 obtains optical surface measurement data (stylus measurement data) related to front surface 2a of lens 2 by bringing probe 11 into contact with front surface 2a that is an optical surface of lens 2. For example, first measurer 10 is capable of obtaining, as the optical surface measurement data, three-dimensional coordinate data (three-dimensional coordinate point group) in XYZ space related to the three-dimensional shape of front surface 2a of lens 2.

Second measurer 20 is a camera measurer that includes camera 21 for measuring the outline of lens 2 that is the measurement target object. Second measurer 20 measures the outline of lens 2 (measurement target object) with use of camera 21. Specifically, second measurer 20 is capable of obtaining outline measurement data related to the outline of lens 2 by capturing an image of edge 2c of lens 2 with use of camera 21. The outline measurement data is, for example, two-dimensional coordinate data (two-dimensional coordinate point group) in the XY plane. In the present embodiment, since the outline of lens 2 is circular, the outline measurement data of lens 2 measured by second measurer 20 is the outer diameter measurement data related to the circular shape. When capturing an image of edge 2c of lens 2 with use of camera 21, the entire circumference of edge 2c may be captured along edge 2c of lens 2, or several locations of the entire circumference of edge 2c may be captured intermittently (e.g., at equal intervals along the circumference direction).

Stage 30 is a platform on which a measurement target object is placed. For example, lens 2 as the measurement target object is placed on stage 30. In the present embodiment, rotation mechanism 40 is disposed on stage 30, and lens 2 is placed on rotation mechanism 40. In other words, lens 2 is placed on stage 30 via rotation mechanism 40. Lens 2 may be placed directly on stage 30.

Stage 30 can be moved arbitrarily in the XY plane by controller 52 of processor 50. In other words, stage 30 can be moved separately along each of the X-axis and Y-axis. Such a movement of stage 30 allows first measurer 10 that includes probe 11 or second measurer 20 that includes camera 21 to be positioned anywhere on stage 30. In other words, by moving stage 30, probe 11 or camera 21 can be positioned anywhere on front surface 2a of lens 2 placed on stage 30. Stage 30 may be configured to move not only along the X-axis and Y-axis, but also along the Z-axis.

Figure 3:
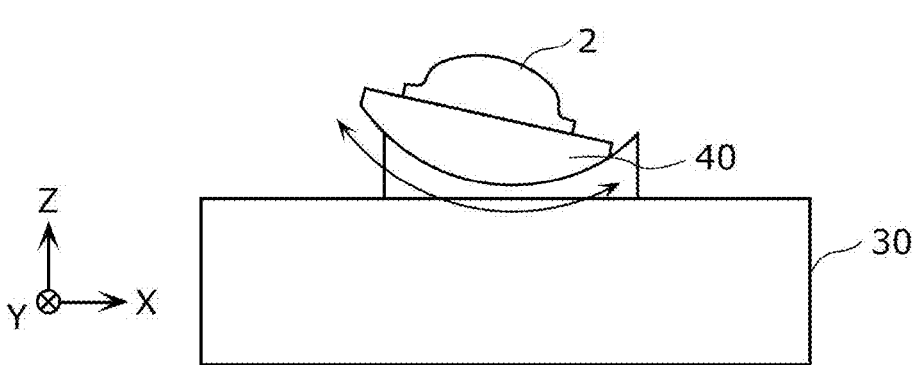
FIG. 3 is an explanatory diagram of a rotational mechanism in the measurement system according to Embodiment 1.

Rotation mechanism 40 includes a function of rotating lens 2 that is the measurement target object in at least two axial directions. In the present embodiment, rotation mechanism 40 is capable of rotating lens 2 in three axial directions of X, Y, and Z axes. Specifically, as illustrated in FIG. 3, rotation mechanism 40 is capable of changing the orientation of lens 2 placed on rotation mechanism 40 by slidably rotating part of rotation mechanism 40. The rotation of rotation mechanism 40 can be controlled by controller 52 of processor 50.

Processor 50 includes calculator 51 and controller 52. Processor 50 may further include a storage such as memory. Calculator 51 and controller 52 can be configured by, for example, a processor or a circuit. In this case, calculator 51 and controller 52 may include separate processors or circuits, or may include a single processor or circuit as a whole. Processor 50 that includes calculator 51 and controller 52 may be configured by an information processing device such as a computer. In this case, the processes described as the operation of processor 50, such as calculator 51, are executed by a computer. For example, each process can be executed by processor 50 by a computer executing a program using hardware resources such as a processor (CPU), memory, and an input and output circuit. The result of each process may be stored in memory (not illustrated) in processor 50. Processor 50 may be a terminal device provided near stage 30 or a remote device such as a server.

Calculator 51 calculates the optical axis center position (optical axis center position) of the measurement target object from the optical surface measurement data obtained by measuring the optical surface of the measurement target object with use of probe 11. Specifically, as illustrated in (a) of FIG. 4, calculator 51 calculates optical axis center position C1 of lens 2 from the three-dimensional coordinate data obtained as the optical surface measurement data by measuring front surface 2a, which is an optical surface of lens 2, with use of probe 11.

Calculator 51 also calculates the outline center position of the measurement target object from the outline measurement data obtained by measuring the outline of the measurement target object with use of camera 21. Specifically, as illustrated in (b) of FIG. 4, calculator 51 calculates outline center position C2 of lens 2 from the two-dimensional coordinate data obtained as outline measurement data by measuring the outline of lens 2 with use of camera 21.

Figure 4:
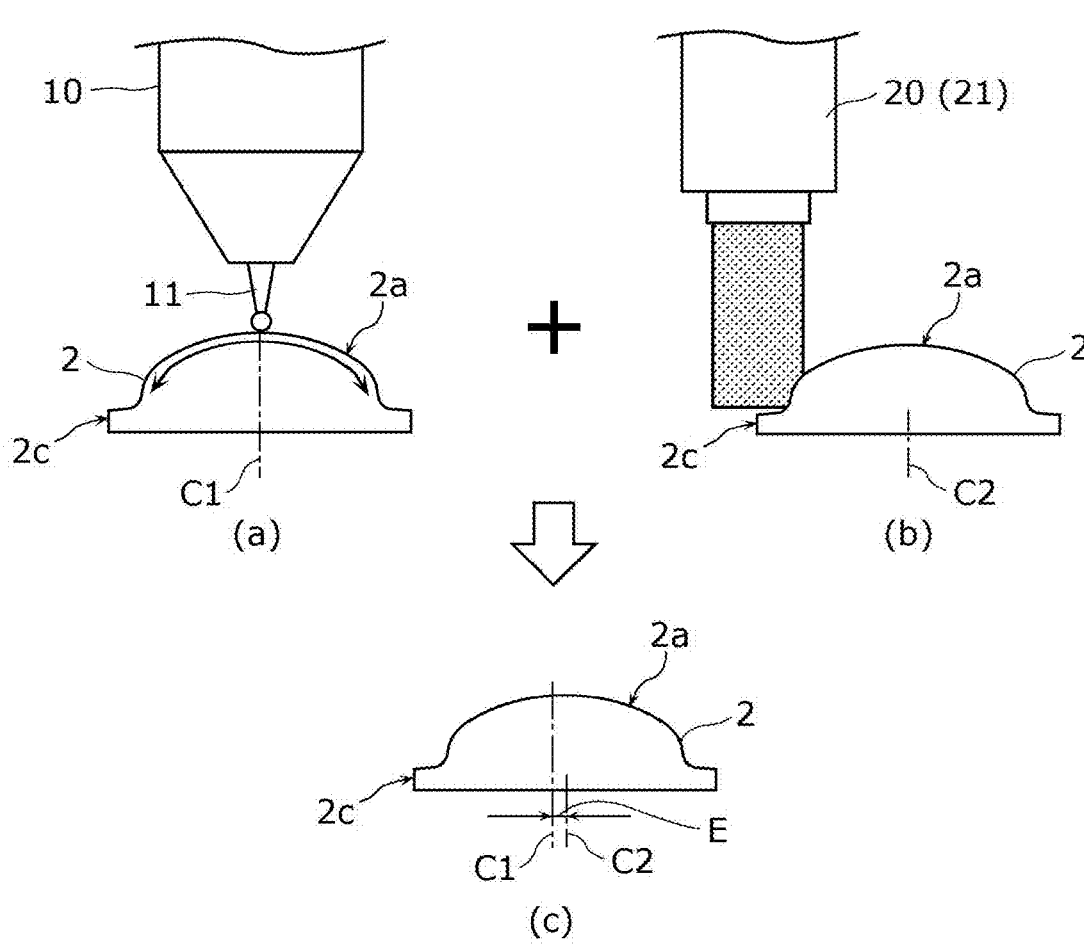
FIG. 4 is an explanatory diagram of a principle of an eccentricity measurement method using the measurement system according to Embodiment 1.

As illustrated in (c) of FIG. 4, calculator 51 calculates, as eccentricity E of lens 2, the amount of deviation between optical axis center position C1 calculated from the optical surface measurement data obtained by probe 11 and outline center position C2 calculated from the outline measurement data obtained by camera 21.

Calculator 51 is also capable of calculating the setting orientation of the measurement target object in which the object is set, from the optical surface measurement data obtained by measuring the optical surface of the object with use of probe 11. Specifically, calculator 51 is capable of calculating the setting orientation of lens 2, from the three-dimensional coordinate data (optical surface measurement data) obtained by measuring, with use of probe 11, front surface 2a that is the optical surface of lens 2 placed on rotation mechanism 40.

Controller 52 includes a function of controlling rotation mechanism 40. In other words, controller 52 is capable of rotating rotation mechanism 40. In this case, as described above, the setting orientation of lens 2 is calculated in advance by measuring front surface 2a of lens 2 placed on rotation mechanism 40. In this way, the orientation of lens 2 (measurement target object) can be adjusted by rotating rotation mechanism 40 using controller 52 before measuring, with use of probe 11, the optical surface measurement data for calculating optical axis center position C1 of lens 2.

Input and output device 60 is a user interface that includes an input function for the user to input characters, numbers, and the like and an output function for outputting a result of calculation and the like performed by measurement system 1. Input and output device 60 is, for example, but not limited to, a terminal that includes a touch panel. Input and output device 60 may separately include an input device with input functions and an output device with output functions. In this case, the input device is a keyboard, mouse, buttons, or the like and the output device is a display or the like.

Figure 5:
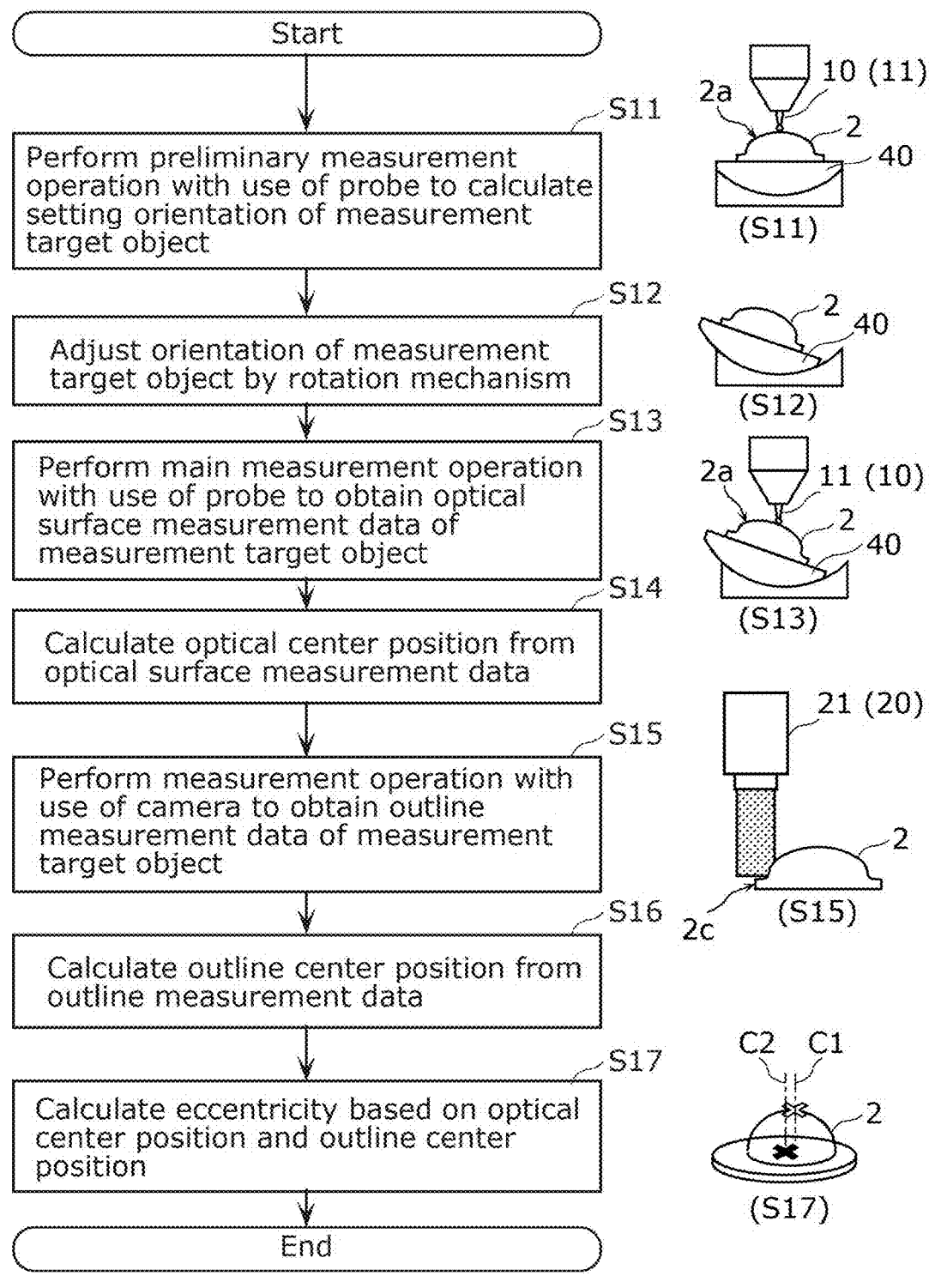
FIG. 5 is a flow diagram of the eccentricity measurement method according to Embodiment 1.

Next, an eccentricity measurement method of measuring eccentricity E of lens 2 using measurement system 1 will be described with reference to FIG. 2 to FIG. 4 and FIG. 5. FIG. 5 is a flow diagram of an eccentricity measurement method according to Embodiment 1.

First, as illustrated in FIG. 2, lens 2 that is a measurement target object (target lens) is placed on stage 30. In the present embodiment, rotation mechanism 40 set on stage 30 is used, and thus, lens 2 is placed on rotation mechanism 40. Stage 30 is then moved so that lens 2 and probe 11 are opposite to each other.

Then, as illustrated in FIG. 5, the optical surface measurement data for calculating optical axis center position C1 of lens 2 is obtained by measuring, with use of probe 11, front surface 2a (measurement target surface) which is the optical surface of lens 2 (steps S11 to S13).

In the present embodiment, after adjusting the setting orientation of lens 2, the optical surface measurement data for calculating optical axis center position C1 of lens 2 is obtained with use of probe 11.

In this case, the setting orientation of lens 2 is first calculated by performing, with use of probe 11, a preliminary measurement operation on front surface 2a of lens 2 (step S11). Specifically, front surface 2a of lens 2 is measured by first measurer 10 that includes probe 11. For example, the entire three-dimensional shape of front surface 2a of lens 2 is measured by sliding probe 11 over entire front surface 2a of lens 2, while bringing probe 11 into contact with front surface 2a of lens 2 and moving stage 30. The measurement data related to the three-dimensional shape measured by first measurer 10 is transmitted to calculator 51 as optical surface measurement data (three-dimensional coordinate data) for calculating the setting orientation of lens 2. Calculator 51 then calculates the setting orientation of lens 2, based on the obtained optical surface measurement data. For example, calculator 51 calculates the degree of tilt of front surface 2a of lens 2 with respect to the XY plane (optical surface tilt amount).

Next, the orientation of lens 2 is adjusted by rotation mechanism 40 (step S12). Specifically, the orientation of lens 2 is adjusted by rotating rotation mechanism 40 based on the setting orientation of lens 2 calculated in step S11 so that the orientation of lens 2 on rotation mechanism 40 becomes a predetermined orientation. Specifically, controller 52 controls the rotation of rotation mechanism 40 to adjust the orientation of lens 2 so that lens 2 is no longer tilted with respect to the XY plane.

Next, the optical surface measurement data for calculating optical axis center position C1 of lens 2 is obtained by performing, with use of probe 11, a main measurement operation on front surface 2a (optical surface) of lens 2 whose orientation has been adjusted by rotation mechanism 40 (step S13). Specifically, front surface 2a of lens 2 is measured by first measurer 10 that includes probe 11, in a similar manner to step S11. For example, the entire three-dimensional shape of front surface 2a of lens 2 is measured again by sliding probe 11 over entire front surface 2a of lens 2, while bringing probe 11 into contact with front surface 2a of lens 2 and moving stage 30. The measurement data related to the three-dimensional shape measured by probe 11 is transmitted to calculator 51 as optical surface measurement data (three-dimensional coordinate data) for calculating optical axis center position C1 of lens 2. In other words, calculator 51 obtains the optical surface measurement data for calculating optical axis center position C1 of lens 2.

In such a manner, in the present embodiment, before measuring front surface 2a of lens 2a in the main measurement operation with use of probe 11, front surface 2a of lens 2 is measured in the preliminary measurement operation with use of probe 11 to calculate the degree of tilt of front surface 2a of lens 2 (optical surface tilt amount) and adjust the orientation of lens 2. After adjusting the orientation of lens 2, front surface 2a of lens 2 is measured in the main measurement operation with use of probe 11 to obtain optical surface measurement data for calculating optical axis center position C1 of lens 2.

Next, optical axis center position C1 of lens 2 is calculated from the optical surface measurement data obtained in step S13 (step S14). Specifically, calculator 51 calculates optical axis center position C1 of lens 2 based on the optical surface measurement data obtained in step S13. For example, calculator 51 calculates the vertex of front surface 2a of lens 2 (optical surface vertex) as optical axis center position C1.

Next, camera 21 of second measurer 20 measures the outline of lens 2 to obtain outline measurement data (step S15). For example, by capturing an image of edge 2c of lens 2 with use of camera 21, two-dimensional coordinate data is obtained as outline measurement data related to the outline of lens 2.

Next, outline center position C2 of lens 2 is calculated from the outline measurement data obtained in step S15 (step S16). Specifically, calculator 51 calculates outline center position C2 of lens 2 based on the outline measurement data obtained in step S15. For example, when the outline of lens 2 is circular, calculator 51 calculates the center of the circle with the outline of lens 2, as outline center position C2 in the XY plane.

Next, eccentricity E of lens 2 is calculated based on optical axis center position C1 calculated in step S14 and outline center position C2 calculated in step S16 (step S17). Specifically, calculator 51 calculates the amount of deviation, which is the difference between optical axis center position C1 calculated from the optical surface measurement data obtained by probe 11 and outline center position C2 calculated from the outline measurement data obtained by camera 21, as eccentricity E of lens 2.

As described above, in the eccentricity measurement method and measurement system 1 according to the present embodiment, first measurer 10 that includes probe 11 and second measurer 20 that includes camera 21 are used to measure eccentricity E of lens 2 that is the measurement target object. Specifically, as illustrated in (a) of FIG. 4, optical axis center position C1 of lens 2 is calculated from the optical surface measurement data (probe measurement data) obtained by measuring front surface 2a of lens 2 with use of probe 11. As illustrated in (b) of FIG. 4, outline center position C2 of lens 2 is then calculated from the outline measurement data (camera measurement data) obtained by measuring the outline of lens 2 with use of camera 21. Subsequently, as illustrated in (c) of FIG. 4, the amount of deviation between calculated optical axis center position C1 and calculated outline center position C2 is calculated as eccentricity E of lens 2.

With this, eccentricity E of lens 2 that is the measurement target object can be measured with high accuracy. Accordingly, it is possible to accurately determine the quality of lens 2 based on eccentricity E, and to accurately improve molds for mass production for producing lens 2.

Moreover, in the eccentricity measurement method and measurement system 1 according to the present embodiment, the setting orientation of lens 2 is calculated by performing, with use of probe 11, a preliminary measurement operation on the optical surface of lens 2, and based on the setting orientation of lens 2, the orientation of lens 2 is adjusted using rotation mechanism 40. Then, the optical surface measurement data for calculating optical axis center position C1 of lens 2 is obtained by performing, with use of probe 11, a main measurement operation on the optical surface of lens 2 whose orientation has been adjusted by rotation mechanism 40.

With this, it is possible to eliminate the tilt of the setting orientation of lens 2, which is an error factor in eccentricity measurement. Accordingly, eccentricity E of lens 2 can be measured with higher accuracy.

Variation of Embodiment 1

Next, a variation of the eccentricity measurement method according to Embodiment 1 will be described below.

In measurement system 1 according to Embodiment 1, the position of probe 11 is different from the position of camera 21. In other words, the measurement position by probe 11 is different from the measurement position by camera 21. For this reason, the positional relationship between probe 11 and camera 21 may be calculated, and the measurement results from probe 11 and camera 21 may be processed in advance to handle the measurement results from probe 11 and camera 21 in the same coordinates. In other words, in order to measure the eccentricity of lens 2 that is the measurement target object, before performing measurement with use of probe 11 and camera 21, the distance (offset amount) between the contact position of lens 2 with probe 11 and the focal point of camera 21 may be calculated, and the positions of probe 11 and camera 21 may be calibrated.

Figure 6:
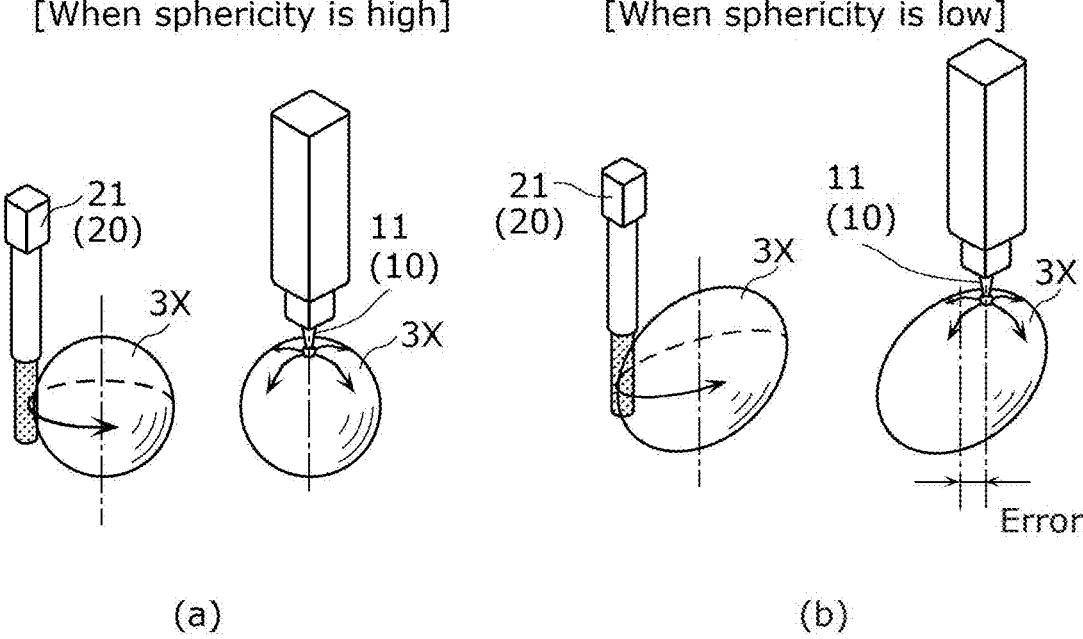
FIG. 6 illustrates a case where the sphericity of a true sphere that is a calibration jig is high and a case where the sphericity of the true sphere is low.

When performing such calibration, a true sphere is possibly used as a calibration jig. In this case, as illustrated in (a) of FIG. 6, when the sphericity of true sphere 3X is high, the error in the center position, which is the difference between the center position of true sphere 3X calculated by probe 11 and the center position of true sphere 3X calculated by camera 21, is small. However, as illustrated in (b) of FIG. 6, when the sphericity of true sphere 3X is low, the error in the center position, which is the difference between the center position of true sphere 3X calculated by probe 11 and the center position of true sphere 3X calculated by camera 21, is large.

In addition, when true sphere 3X is used as a calibration jig, a shadow is generated in the XY plane at a point where the tilt angle of true sphere 3X is at least 90 degrees. This may reduce the edge detection accuracy when the edge of true sphere 3X is measured with use of camera 21.

Figure 7:
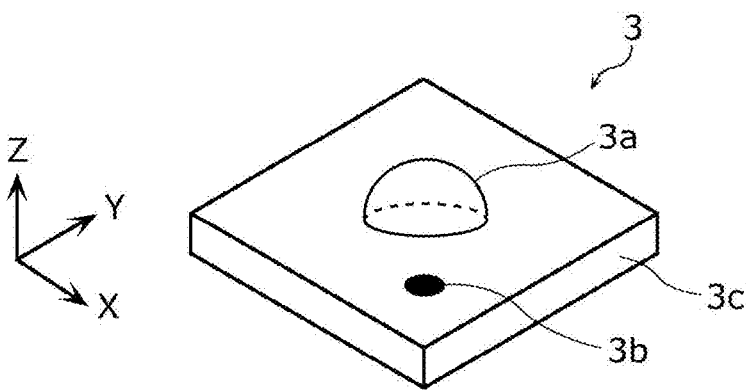
FIG. 7 is a perspective view of a calibration jig used in a variation of Embodiment 1.

Therefore, in the present variation, calibration jig 3 illustrated in FIG. 7 is used instead of a true sphere to calibrate the position of probe 11 and the position of camera 21. FIG. 7 is a perspective view of calibration jig 3 used in the variation of Embodiment 1.

As illustrated in FIG. 7, calibration jig 3 includes reference projection 3a and reference marker 3b. Calibration jig 3 further includes flat plate 3c. Reference projection 3a and reference marker 3b are disposed on flat plate 3c.

Reference projection 3a is a projection that is in a rotationally symmetrical shape and has a maximum tilt angle of at most 90 degrees. As an example, reference projection 3a is hemispherical and disposed in the center of flat plate 3c.

Reference marker 3b is a plane figure that can be recognized by camera 21. As an example, reference marker 3b is a colored circle such as a black circle. Reference marker 3b is printed in the vicinity of reference projection 3a on flat plate 3c. In the present variation, there is one reference marker 3b, but the number of reference markers 3b is not limited to one. For example, a plurality of reference markers 3b may be disposed in the vicinity of reference projection 3a.

Next, a method of calculating the offset amount which is the distance between the contact position of probe 11 and the focal point of camera 21, using calibration jig 3 will be described.

Figure 8:
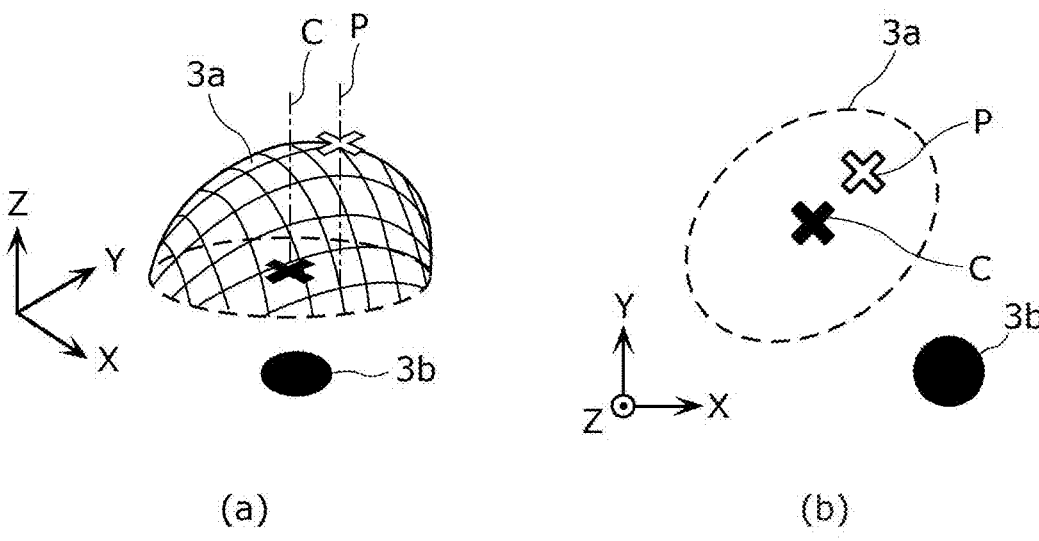
FIG. 8 illustrates a vertex position and a center position of the calibration jig according to the variation of Embodiment 1.

It is assumed that the setting orientation of calibration jig 3 when reference marker 3b is located at the lower right of reference projection 3a is the state where calibration jig 3 is set at "0°", and as illustrated in FIG. 8, it is assumed that vertex position P and center position C of reference projection 3a do not match in the state of 0°.

In this case, first, as illustrated in (a) of FIG. 9, calibration jig 3 is placed on stage 30 (see FIG. 2) so that calibration jig 3 is set at 0°, and reference projection 3a and reference marker 3b are measured with use of probe 11 and camera 21.

Specifically, vertex position P of reference projection 3a is calculated by measuring, with use of probe 11, the vicinity of the center of reference projection 3a. For example, by bringing probe 11 into contact with the surface of reference projection 3a, three-dimensional measurement data (three-dimensional coordinate point group) related to the surface of reference projection 3a is obtained, and vertex position P of reference projection 3a is calculated from the obtained three-dimensional measurement data.

Center position C of reference projection 3a is calculated by measuring the edge portion of reference projection 3a with use of camera 21. For example, by measuring the edge portion of reference projection 3a with use of camera 21, two-dimensional measurement data (two-dimensional coordinate point group) related to the outline of reference projection 3a is obtained, and center position C of reference projection 3a is calculated from the obtained two-dimensional measurement data.

The difference between vertex position P and center position C is the offset amount. In the present variation, the offset amount is calculated by changing the setting angle of calibration jig 3 at least three times.

For example, when the setting angle of calibration jig 3 is changed three times, as illustrated in (b) to (d) in FIG. 9, calibration jig 3 is rotated at 90° intervals. The vertex position P and center position C of reference projection 3a are calculated each of when calibration jib 3 is set at 90° ((b) in FIG. 9), 180° ((c) in FIG. 9), and 270° ((d) in FIG. 9) in a similar manner to when calibration jib 3 is set at 0°. At this time, vertex positions of reference projection 3a calculated when calibration jig 3 is set at 0°, 90°, 180°, and 270° are respectively defined as $P_1$, $P_2$, $P_3$, and $P_4$. In a similar manner, the center positions of reference projection 3a calculated when calibration jig 3 is set at 0°, 90°, 180°, and 270° are respectively defined as $C_1$, $C_2$, $C_3$, $C_4$.

Figure 10:
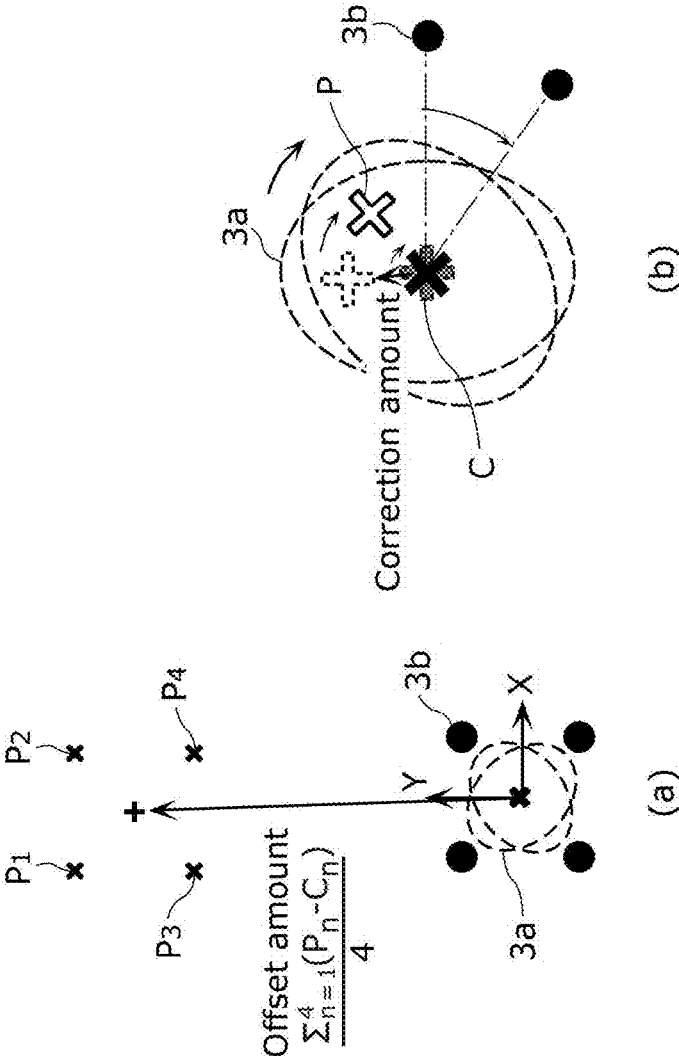
FIG. 10 is an explanatory diagram of a method of calculating an offset amount and a correction amount according to the variation of Embodiment 1.

Then, as illustrated in (a) of FIG. 10, for each of 0°, 90°, 180°, and 270°, center position C is subtracted from vertex position P, and coordinate data group with center position C as the origin, and the average of the group is set to an offset amount. Specifically, for each of 0°, 90°, 180°, and 270°, four items of coordinate data, in each of which center position C is subtracted from vertex position P, are generated, and the average of the four items of coordinate data is set to an offset amount.

Moreover, as illustrated in (b) of FIG. 10, the coordinates of vertex position P and center position C of reference projection 3a are combined based on the obtained offset amount, the coordinates are rotated such that the straight line connecting reference marker 3b and center position C of reference projection 3a is at the position where reference marker 3b is set at 0°, and the difference between vertex position P and center position C of reference projection 3a at that time is calculated as a correction amount (offset correction amount). The calculated correction amount is added to the offset amount. In such a manner, the relationship between center position C of reference projection 3a and the position of reference marker 3b of calibration jig 3 is used to calculate the correction amount, and the calculated correction amount is added to the offset amount.

The offset amount to which the correction amount has been added is then used to calibrate (offset) the position of probe 11 and the position of camera 21.

In such a manner, by using calibration jig 3 to calculate the offset amount and calibrating the position of probe 11 and the position of camera 21 in advance, the eccentricity can be measured with high accuracy when measuring eccentricity E of lens 2 as in Embodiment 1.

In particular, in the present variation, calibration jig 3 that includes reference projection 3a and reference marker 3b is used, and the relationship between vertex position P and center position C of reference projection 3a is corrected using reference marker 3b. Accordingly, the offset amount can be calculated with high accuracy. In other words, the position of probe 11 and the position of camera 21 can be calibrated with high accuracy. This allows for even more accurate measurement of eccentricity E of lens 2 when measuring eccentricity E of lens 2.

In the present variation, the setting angle of calibration jig 3 is changed only three times when calculating the correction amount to be added to the offset amount. However, the number of changes is not limited to three. For example, the setting angle of calibration jig 3 may be changed only once (e.g., set at only 0° and 180°) or four or more times. By changing the setting angle four or more times, the accuracy of the correction amount added to the offset amount can be expected to improve. As a result, the position of probe 11 and the position of camera 21 can be calibrated with higher accuracy, and eccentricity E of lens 2 can be measured with even higher accuracy when measuring eccentricity E of lens 2.

Embodiment 2

Next, an eccentricity measurement method according to Embodiment 2 will be described with reference to FIG. 11. FIG. 11 is a flow diagram of the eccentricity measurement method according to Embodiment 2.

In the present embodiment, eccentricity E of lens 2 is measured using measurement system 1 according to Embodiment 1. In the present embodiment, eccentricity E of lens 2 is measured without using rotation mechanism 40, unlike Embodiment 1. In other words, in Embodiment 1, after adjusting the setting orientation of lens 2 using rotation mechanism 40, eccentricity E of lens 2 is measured with use of probe 11 and camera 21. In the present embodiment, eccentricity E of lens 2 is measured with use of probe 11 and camera 21 without adjusting the setting orientation of lens 2 using rotation mechanism 40. Accordingly, in the present embodiment, lens 2 that is the measurement target object may be placed directly on stage 30.

As illustrated in FIG. 11, in the eccentricity measurement method according to the present embodiment, first, the optical surface measurement data for calculating optical axis center position C1 of lens 2 is obtained by performing, with use of probe 11, a main measurement operation on front surface 2a (optical surface) of lens 2 (step S21). Specifically, in a similar manner to step S13 in the eccentricity measurement method according to Embodiment 1, the optical surface measurement data (three-dimensional coordinate data) for calculating optical axis center position C1 of lens 2 is obtained by measuring the three-dimensional shape of front surface 2a of lens 2 by bringing probe 11 into contact with front surface 2a of lens 2.

Next, optical axis center position C1 of lens 2 and the setting orientation of lens 2 are calculated from the optical surface measurement data obtained in step S21 (step S22). The method of calculating optical axis center position C1 of lens 2 from the optical surface measurement data measured by probe 11 will be described later. The method of calculating the setting orientation of lens 2 from the optical surface measurement data measured by probe 11 is the same as in Embodiment 1.

Next, the outline measurement data is obtained by measuring the outline of lens 2 with use of camera 21 (step S23). Specifically, in a similar manner to step S15 in the eccentricity measurement method according to Embodiment 1, two-dimensional coordinate data is obtained as outline measurement data related to the outline of lens 2 by capturing an image of edge 2c of lens 2 with use of camera 21.

Next, outline center position C2 of lens 2 is calculated from the outline measurement data obtained in step S23 (step S24). In the present embodiment, the orientation of lens 2 is not adjusted by rotation mechanism 40. Accordingly, coordinate transformation is performed on the outline measurement data based on the setting orientation of lens 2 calculated in step S22, and outline center position C2 is calculated from the outline measurement data after the coordinate transformation. The details of step S24 will be described later.

Next, eccentricity E of lens 2 is calculated based on optical axis center position C1 calculated in step S22 and outline center position C2 calculated in step S24 (step S25). Specifically, in a similar manner to step S17 in the eccentricity measurement method according to Embodiment 1, calculator 51 calculates, as eccentricity E of lens 2, the amount of deviation, which is the difference between optical axis center position C1 calculated from the optical surface measurement data obtained by probe 11 and outline center position C2 calculated from the outline measurement data obtained by camera 21.

Figure 12:
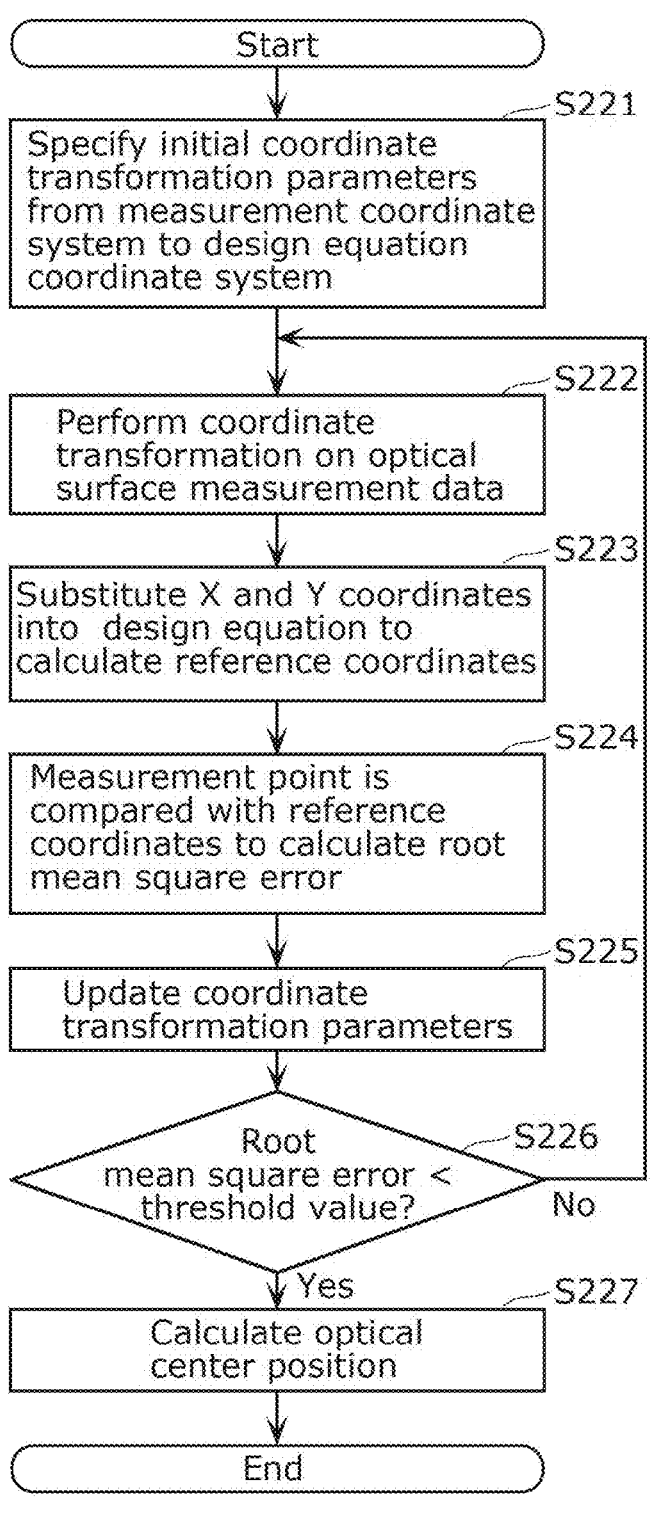
FIG. 12 is a flow diagram of a method of calculating an optical axis center position in the eccentricity measurement method according to Embodiment 2.

The details of step S22, which calculates optical axis center position C1 in the present embodiment, will be described with reference to FIG. 12. FIG. 12 is a flow diagram of a method of calculating optical axis center position C1 in the eccentricity measurement method according to Embodiment 2.

As illustrated in FIG. 12, first, the initial coordinate transformation parameters from the measurement coordinate system to the design equation coordinate system are specified (step S221). In other words, the initial values of the coordinate transformation parameters are set. The initial values of the coordinate transformation parameters may be predetermined or arbitrary. Here, the number of coordinate transformation parameters is six in total, which are three parameters for the amount of shift in the directions of the X-, Y-, and Z-axes and three parameters for the amount of rotation about the X-, Y-, and Z-axes.

Next, coordinate transformation is performed on the optical surface measurement data obtained in step S21 (step S222). Specifically, the coordinates of the optical surface measurement data are transformed using the initial values of the coordinate transformation parameters specified in step S221.

Next, the X and Y coordinates are substituted into the design equation to calculate the reference coordinates (step S223). Specifically, the X and Y coordinate values of three-dimensional coordinate point group p11 to p1$n$ included in the optical surface measurement data on which the coordinate transformation has been performed in step S222 are substituted into the design equation that represents the shape of lens 2 that is the measurement target object. By substituting the X and Y coordinates of three-dimensional coordinate point group p11 to p1$n$ into the design equation, the reference coordinates are calculated for each measurement point. An example of the design equation is a rotationally symmetric aspheric surface equation. The rotationally symmetric aspheric surface equation is a polynomial of matrix variables, e.g., expressed by (Equation 1) below.

[Math. 1]

$$z = \frac{ch^2}{1 + \sqrt{1 - (1+k)c^2h^2}} + \sum_{i=1}^{20} A_i|h|^i \qquad \text{(Equation 1)}$$

In (Equation 1), "h" denotes the distance from the center, "c" denotes the reciprocal of the radius of curvature, "k" denotes the conic coefficient, and "Ai" denotes the polynomial coefficient. The total number of constants in the reference equation to be prepared is 22. Note that "h" is calculated from the X and Y coordinates using the following (Equation 2).

[Math. 2]

$$\sqrt{x^2 + y^2} = h \qquad \text{(Equation 2)}$$

Next, the root mean square error is calculated by comparing the measurement point with the reference coordinates (step S224). Specifically, the three-dimensional coordinates of the measurement point of the optical surface measurement data are compared with the three-dimensional coordinates of the respective reference coordinates. For example, the Z coordinate of the measurement point of the optical surface measurement data is compared with the Z coordinates of the respective reference coordinates. The root mean square error (RMSE) of the differences is then calculated. The calculated root mean square error represents the difference between the Z coordinate of each measurement point and the reference coordinate.

Next, the coordinate transformation parameters are updated (step S225). Specifically, the coordinate transformation parameters are updated so that the difference between the three-dimensional coordinates of each measurement point and the three-dimensional coordinates of the reference coordinates is minimized.

Next, it is determined whether the root mean square error calculated in step S224 is smaller than a predetermined threshold value (step S226). When the root mean square error calculated in step S224 is smaller than the predetermined threshold value (Yes in S226), this process is terminated. On the other hand, when the root mean square error calculated in step S224 is greater than the predetermined threshold value (No in S226), the processes in steps S222 to S225 are repeated. As a result of iterative calculation of the coordinate transformation parameters, when the root mean square error falls below the predetermined threshold value or converges to the predetermined value and no longer changes, the iterative calculation is terminated and the coordinate transformation parameters are determined. When the newly calculated root mean square error value is higher than the previous calculation result, it may be determined that the root mean square error has converged.

Next, optical axis center position C1 is calculated (step S227). Specifically, optical axis center position C1 in the measurement coordinate system is obtained by performing coordinate transformation on the origin [0,0,0] of the design equation coordinate system using the coordinate transformation parameters. The calculus equation uses position vector P, which is generated from the three coordinate transformation parameters of the amount of shift in the X-axis, Y-axis, and Z-axis directions, and rotation matrix R, which is generated from three parameters of the amount of rotation around the X-axis, Y-axis, and Z-axis. With this, optical axis center position C1 is expressed by (Equation 3) below. In (Equation 3), RT denotes the transpose matrix of rotation matrix R.

[Math. 3]

$$C1 = R^\top \left( \begin{bmatrix} 0 \\ 0 \\ 0 \end{bmatrix} - P \right) \qquad \text{(Equation 3)}$$

In the present embodiment, in this way, optical axis center position C1 can be calculated from the optical surface measurement data obtained with use of probe 11.

Figure 13:
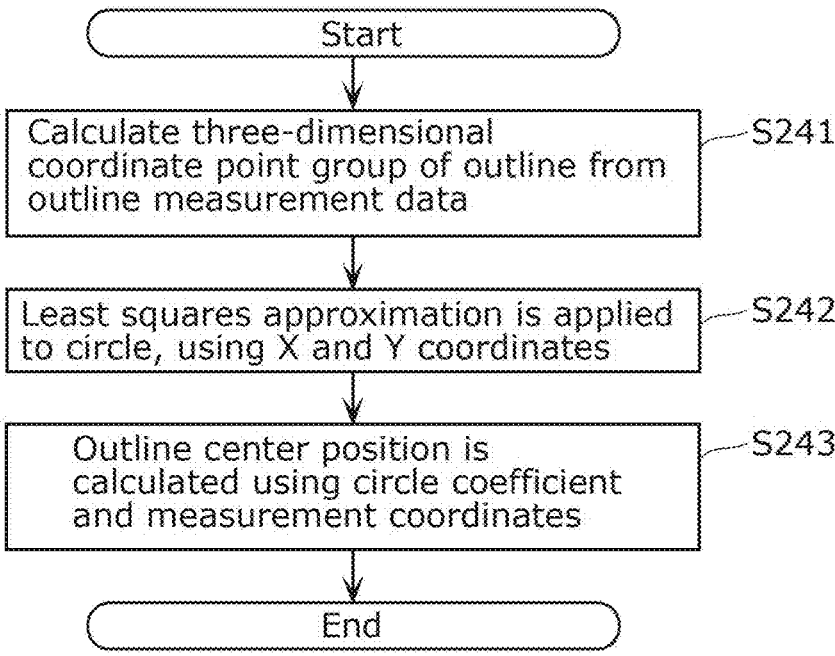
FIG. 13 is a flow diagram of a method of calculating an outline center position in the eccentricity measurement method according to Embodiment 2.

Next, the details of step S24, which calculates outline center position C2 in the present embodiment, will be described with reference to FIG. 13. FIG. 13 is a flow diagram of a method of calculating outline center position C2 in an eccentricity measurement method according to Embodiment 2.

In this case, as illustrated in FIG. 13, first, a three-dimensional coordinate point group of the outline of lens 2 is calculated from the outline measurement data obtained in step S23 (step S241). Specifically, a three-dimensional coordinate point group of the outline of lens 2 is calculated from the outline measurement data (camera measurement data) by image processing. Here, the outline measurement data includes a measurement image and measurement coordinates. An edge detection process is applied to the measurement image, and the obtained edge detection points are transformed to the measurement coordinate system based on the measurement coordinates to obtain three-dimensional coordinate point group p21 to p2$n$.

Here, when the outline of lens 2, which is the measurement target object, is larger than the field of view of the camera, a plurality of items of outline measurement data are obtained. In this case, however, the step of calculating the three-dimensional coordinate point group of the outline of lens 2 is performed a plurality of times, and the plurality of items of calculated three-dimensional coordinate point groups are combined as single three-dimensional coordinate point group.

Next, least squares approximation is applied to the circle, using the X and Y coordinates (step S242). Specifically, least squares approximation is applied to the circle, using the values of the X and Y coordinates of three-dimensional coordinate point group p21 to p2$n$. Here, the circle equation is expressed by (Equation 4) below. In (Equation 4), "a" denotes the X coordinate of the circle center, "b" denotes the Y coordinate of the circle center, and "r" denotes the radius of the circle.

[Math. 4]

$$\sqrt{(x - a)^2 + (y - b)^2} = r \qquad \text{(Equation 4)}$$

Next, outline center position C2 is calculated using the circle coefficient and the measurement coordinates (step S243). Specifically, outline center position C2 is calculated by using a and b calculated in step S242 as the X and Y coordinates of the outline center, respectively, and the Z coordinate of the measurement coordinate of the outline measurement data as the Z coordinate of the outline center. When there are a plurality of items of outline measurement data, the Z coordinate of the measurement coordinates of the outline measurement data may be an average value of the plurality of items of outline measurement data.

In the present embodiment, in this way, outline center position C2 can be calculated from the outline measurement data obtained by camera 21.

As described above, in the eccentricity measurement method according to the present embodiment, too, first measurer 10 that includes probe 11 and second measurer 20 that includes camera 21 are used to measure eccentricity E of lens 2, in a similar manner to Embodiment 1. Specifically, optical axis center position C1 of lens 2 is calculated from the optical surface measurement data obtained by measuring front surface 2a of lens 2 with use of probe 11, and outline center position C2 of lens 2 is calculated from the outline measurement data obtained by measuring the outline of lens 2 with use of camera 21. The amount of deviation between optical axis center position C1 and outline center position C2 is calculated as eccentricity E of lens 2.

With this, in a similar manner to Embodiment 1, eccentricity E of lens 2, which is the measurement target object, can be measured with high accuracy Moreover, in the method of measuring the eccentricity according to the present embodiment, unlike Embodiment 1, the orientation of lens 2 is not controlled by rotation mechanism 40. However, in the step of calculating outline center position C2, the setting orientation of lens 2 is calculated from the optical surface measurement data, the coordinate transformation is performed on the outline measurement data based on the setting orientation, and outline center position C2 is calculated from the outline measurement data on which the coordinate transformation has been performed.

With this, even when lens 2 that is the measurement target object is tilted, eccentricity E of lens 2 can be measured with high accuracy. In other words, eccentricity E of lens 2 can be measured with high accuracy regardless of the orientation of lens 2.

Although the description is omitted, in the present embodiment, too, the position of probe 11 and the position of camera 21 may be calibrated using calibration jig 3 before measuring lens 2 that is the measurement target object in a similar manner to the variation of Embodiment 1. This allows eccentricity E of lens 2 to be calculated with even greater accuracy.

Variations

The eccentricity measurement method, the measurement system and the like according to the present disclosure have been described based on Embodiments 1 and 2. However, the present disclosure is not limited to such embodiments.

For example, in Embodiments 1 and 2, by moving stage 30 without moving probe 11 (first measurer 10) and camera 21 (second measurer 20), the measurement is performed while lens 2, which is the measurement target object, placed on stage 30 is opposite to probe 11 or camera 21. However, the present disclosure is not limited to such an example. Specifically, by moving probe 11 or camera 21 without moving stage 30, the measurement may be performed while lens 2, which is the measurement target object, placed on stage 30 is opposite to probe 11 or camera 21. Alternatively, by moving stage 30 and also moving probe 11 or camera 21, the measurement may be performed while lens 2 is opposite to probe 11 or camera 21. In other words, when arranging lens 2 placed on stage 30 opposite to probe 11 or camera 21, stage 30 and probe 11 or camera 21 may be moved relative to each other.

In addition, a form obtained by making various modifications conceivable by those skilled in the art to each embodiment, and a form realized by arbitrarily combining the structural elements and functions in each embodiment without departing from the gist of the present disclosure are also included in the present disclosure.

INDUSTRIAL APPLICABILITY

The technique according to the present disclosure is useful as an eccentricity measurement method and a measurement system for measuring the eccentricity of an optical component such as a lens.

The invention claimed is:

1. An eccentricity measurement method comprising:

obtaining optical surface measurement data by measuring an optical surface of an object that is a measurement target object with use of a probe;

calculating an optical axis center position of the object from the optical surface measurement data;

obtaining outline measurement data by measuring an outline of the object with use of a camera;

calculating an outline center position of the object from the outline measurement data; and calculating an eccentricity that is an amount of deviation between the optical axis center position and the outline center position.

2. The eccentricity measurement method according to claim 1, wherein in the obtaining of the optical surface measurement data:

a setting orientation of the object is calculated by performing, with use of the probe, a preliminary measurement operation on the optical surface, the setting orientation being an orientation in which the object is set;

an orientation of the object is adjusted based on the setting orientation, using a rotation mechanism that is rotatable in at least two axial directions; and the optical surface measurement data for calculating the optical axis center position of the object is obtained by performing, with use of the probe, a main measurement operation on the optical surface of the object whose orientation has been adjusted using the rotation mechanism.

3. The eccentricity measurement method according to claim 1, wherein in the calculating of the outline center position:

a setting orientation of the object is calculated from the optical surface measurement data, the setting orientation being an orientation in which the object is set;

a coordinate transformation is performed on the outline measurement data based on the setting orientation; and the outline center position is calculated from the outline measurement data on which the coordinate transformation has been performed.

4. The eccentricity measurement method according to claim 1, further comprising:

calibrating a position of the probe and a position of the camera, using a calibration jig that includes a reference projection that is in a rotationally symmetrical shape and has a maximum tilt angle of at most 90 degrees, wherein in the calibrating:

a vertex position of the reference projection is calculated by measuring, with use of the probe, a vicinity of a center of the reference projection;

a center position of the reference projection is calculated by measuring, with use of the camera, an edge portion of the reference projection;

a difference between the vertex position and the center position is calculated as an offset amount; and the position of the probe and the position of the camera are calibrated based on the offset amount.

5. The eccentricity measurement method according to claim 4, wherein the calibration jig further includes at least one reference marker that is recognizable by the camera, and the calibrating includes:

measuring a position of the reference marker with use of the camera;

calculating a correction amount using a relationship between the center position of the reference projection and the position of the reference marker; and adding the correction amount calculated to the offset amount.

6. The eccentricity measurement method according to claim 5, wherein the offset amount is calculated by changing a setting angle of the calibration jig at least once.

7. A measurement system comprising:

a measurement machine that includes: a probe for measuring an optical surface of an object that is a measurement target object; and a camera for measuring an outline of the object; and a calculator, wherein the calculator:

calculates an optical axis center position of the object from optical surface measurement data obtained by measuring the optical surface of the object with use of the probe;

calculates an outline center position of the object from outline measurement data obtained by measuring the outline of the object with use of the camera; and calculates an eccentricity that is an amount of deviation between the optical axis center position and the outline center position.

8. The measurement system according to claim 7, wherein the measurement machine includes: a rotation mechanism that rotates the object in at least two axial directions; and a controller that controls the rotation mechanism, the calculator calculates a setting orientation of the object from the optical surface measurement data obtained by measuring the optical surface of the object in advance with use of the probe, the setting orientation being an orientation in which the object is set, and the controller adjusts an orientation of the object by controlling the rotation mechanism based on the setting orientation, before measuring the optical surface measurement data for calculating the optical axis center position.

* * * * *